US009771819B2

(12) United States Patent
Morgan et al.

(10) Patent No.: US 9,771,819 B2
(45) Date of Patent: Sep. 26, 2017

(54) ANTI-CORNER-LEAKAGE SEAL IN GAS TURBINE

(71) Applicant: General Electric Company, Schenectady, NY (US)

(72) Inventors: Victor John Morgan, Simpsonville, SC (US); Frederic Woodrow Roberts, Jr., Simpsonville, SC (US); Brad Wilson VanTassel, Easley, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 83 days.

(21) Appl. No.: 14/963,735

(22) Filed: Dec. 9, 2015

(65) Prior Publication Data
US 2017/0167283 A1 Jun. 15, 2017

(51) Int. Cl.
*F01D 11/00* (2006.01)
*F01D 25/00* (2006.01)
*F01D 25/24* (2006.01)

(52) U.S. Cl.
CPC .......... *F01D 11/005* (2013.01); *F01D 25/005* (2013.01); *F01D 25/24* (2013.01); *F05D 2220/32* (2013.01); *F05D 2240/128* (2013.01); *F05D 2240/14* (2013.01); *F05D 2240/55* (2013.01); *F05D 2300/502* (2013.01)

(58) Field of Classification Search
CPC ...... F01D 11/005; F01D 25/005; F01D 25/25; F05D 2220/32; F05D 2240/128; F05D 2240/14; F05D 2240/55; F05D 2300/502
See application file for complete search history.

(56) References Cited

U.S. PATENT DOCUMENTS

| 5,154,577 A | 10/1992 | Kellock et al. |
| 5,934,687 A * | 8/1999 | Bagepalli .............. F01D 11/005 277/637 |
| 5,997,247 A | 12/1999 | Arraitz et al. |
| 8,075,255 B2 | 12/2011 | Morgan |
| 9,188,228 B2 * | 11/2015 | Sarawate ............... F16J 15/128 |
| 9,267,385 B2 * | 2/2016 | Steiger .................. F01D 11/005 |

(Continued)

FOREIGN PATENT DOCUMENTS

EP    2 716 875 A2    4/2014

OTHER PUBLICATIONS

Extended European Search Report and Opinion issued in connection with corresponding EP Application No. 16202496.2 dated Apr. 18, 2017.

*Primary Examiner* — Gilbert Lee
(74) *Attorney, Agent, or Firm* — Ernest G. Cusick; Hoffman Warnick LLC

(57) ABSTRACT

Various embodiments include gas turbine seals and methods of forming such seals. In some cases, a turbine includes: a first arc segment adjacent to a second arc segment, each arc segment including an end surface and radially facing surfaces extending from opposite ends of the end surface; a slot located between the end surfaces of the first arc segment and the second arc segment; and a first seal disposed in the slot, the first seal contacting the first arc segment at the end surface and extending over the radially facing surfaces of the first arc segment, the first seal including: a shim contacting the first arc segment; a laminate material over the shim and covering the shim; and a conforming material coupling the laminate material to the shim.

21 Claims, 6 Drawing Sheets

(56) References Cited

U.S. PATENT DOCUMENTS

2013/0106066 A1 5/2013 Sarawate et al.
2014/0348642 A1 11/2014 Weber et al.
2015/0118042 A1 4/2015 Morgan et al.

* cited by examiner

ANTI-CORNER-LEAKAGE SEAL IN GAS TURBINE

BACKGROUND OF THE INVENTION

The subject matter disclosed herein relates to turbines. Specifically, the subject matter disclosed herein relates to seals in gas turbines.

The main gas-flow path in a gas turbine commonly includes the operational components of a compressor inlet, a compressor, a turbine and a gas outflow. There are also secondary flows that are used to cool the various heated components of the turbine. Mixing of these flows and gas leakage in general, from or into the gas-flow path, is detrimental to turbine performance.

The operational components of a gas turbine are contained in a casing. The turbine is commonly surrounded annularly by adjacent arc segments. As used herein, the term "arcuate" may refer to a member, component, part, etc. having a curved or partially curved shape. The adjacent arc segments include outer shrouds, inner shrouds, nozzle blocks, and diaphragms. Arc segments may provide a container for the gas-flow path in addition to the casing alone. Arc segments may secure other components of the turbine and may define spaces within the turbine. Between each adjacent pair of arc segments is a space that permits the arc segments to expand as the operation of the gas turbine forces the arc segments to expand.

Slots are defined on the sides of each arc segment for receiving a seal in cooperation with an adjacent slot of an adjacent arc segment. The seal is placed in the slot to prevent leakage between the areas of the turbine on either side of the seal. These areas may include the main gas-flow path and secondary cooling flows.

The slots within the end of a particular arc segment may be angled in orientation to each other and the slots may connect. When a planar seal is received in each of the two slots that are connected, a gap is left between the two seals. This gap permits leakage between the internal and external areas of the gas turbine. Reducing this gap improves gas turbine performance.

BRIEF DESCRIPTION OF THE INVENTION

Various embodiments of the disclosure include gas turbine seals and methods of forming such seals. In some cases, a turbine includes: a first arc segment adjacent to a second arc segment, each arc segment including an end surface and radially facing surfaces extending from opposite ends of the end surface; a slot located between the end surfaces of the first arc segment and the second arc segment; and a first seal disposed in the slot, the first seal contacting the first arc segment at the end surface and extending over the radially facing surfaces of the first arc segment, the first seal including: a shim contacting the first arc segment; a laminate material over the shim and covering the shim; and a conforming material coupling the laminate material to the shim.

A first aspect of the disclosure includes a gas turbine having: a first arc segment adjacent to a second arc segment, each arc segment including an end surface and radially facing surfaces extending from opposite ends of the end surface; a slot located between the end surfaces of the first arc segment and the second arc segment; and a first seal disposed in the slot, the first seal contacting the first arc segment at the end surface and extending over the radially facing surfaces of the first arc segment, the first seal including: a shim contacting the first arc segment; a laminate material over the shim and covering the shim; and a conforming material coupling the laminate material to the shim.

A second aspect of the disclosure includes a gas turbine having: a first arc segment adjacent to a second arc segment, each arc segment including an end surface and radially facing surfaces extending from opposite ends of the end surface, wherein the end surfaces face one another and are substantially coincident; a slot located between the end surfaces of the first arc segment and the second arc segment; and a first seal disposed in the slot, the first seal contacting the first arc segment at the end surface and extending over the radially facing surfaces of the first arc segment, the first seal including: a shim contacting the first arc segment; a laminate material over the shim and covering the shim, the laminate material including a plurality of segments each contacting the shim; and a conforming material coupling the laminate material to the shim.

A third aspect of the disclosure includes: a method of assembling a seal in a turbine, the method including: forming a seal, the forming including: coupling a laminate material to a first side of a shim using a conforming material; and applying the seal to the turbine, the turbine having: a first arc segment adjacent to a second arc segment, each arc segment including an end surface and radially facing surfaces extending from opposite ends of the end surface; and a slot located between the end surfaces of the first arc segment and the second arc segment, the applying including inserting the seal in the slot such that a second side of the shim of the seal contacts the first arc segment at the end surface and extends over the radially facing surfaces of the first arc segment, the second side of the shim opposing the first side of the shim.

A fourth aspect of the disclosure includes a gas turbine having: a first arc segment adjacent to a second arc segment, each arc segment including an end surface and radially facing surfaces extending from opposite ends of the end surface; a slot located between the end surfaces of the first arc segment and the second arc segment; and a first seal disposed in the slot, the first seal contacting the first arc segment at the end surface and extending over the radially facing surfaces of the first arc segment, the first seal including: a laminate material contacting the first arc segment; and a conforming material contacting the laminate material and sealing the end surface and radially facing surfaces of the first arc segment.

BRIEF DESCRIPTION OF THE DRAWINGS

These and other features of this invention will be more readily understood from the following detailed description of the various aspects of the invention taken in conjunction with the accompanying drawings that depict various embodiments of the disclosure, in which.

Figure 1:
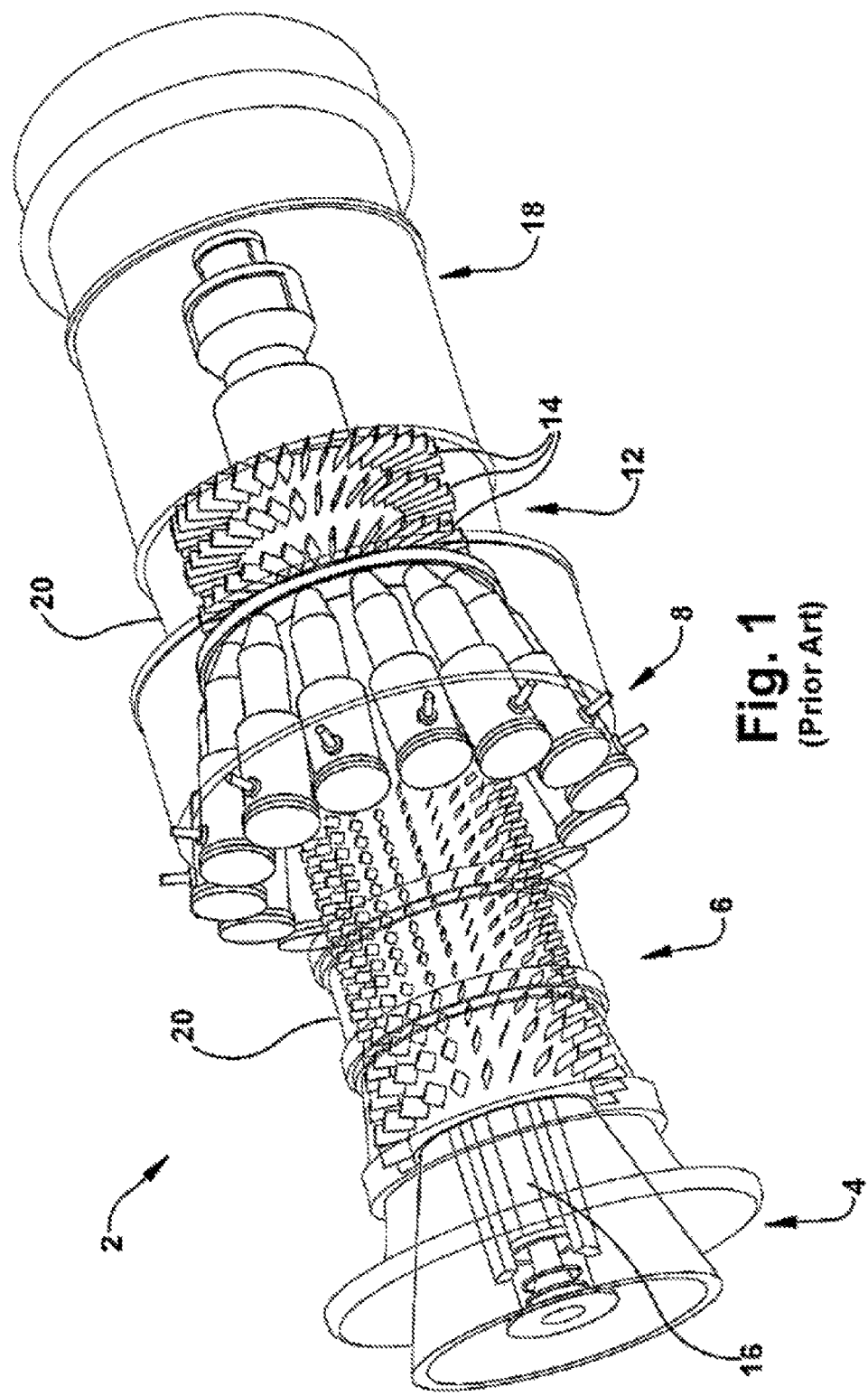
FIG. 1 shows a perspective partial cut-away view of a known gas turbine.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As noted herein, the subject matter disclosed relates to turbines. Specifically, the subject matter disclosed herein relates to cooling fluid flow in gas turbines.

In contrast to conventional approaches, various embodiments of the disclosure include gas turbomachine (or, turbine) buckets having a shroud including an outlet path. The outlet path can be fluidly connected with a plurality of radially extending cooling passageways in the blade, and can direct outlet of cooling fluid from a set (e.g., two or more) of those cooling passageways to a location radially adjacent the shroud, and proximate the trailing edge of the bucket.

As denoted in these Figures, the "A" axis represents axial orientation (along the axis of the turbine rotor, omitted for clarity). As used herein, the terms "axial" and/or "axially" refer to the relative position/direction of objects along axis A, which is substantially parallel with the axis of rotation of the turbomachine (in particular, the rotor section). As further used herein, the terms "radial" and/or "radially" refer to the relative position/direction of objects along axis (r), which is substantially perpendicular with axis A and intersects axis A at only one location. Additionally, the terms "circumferential" and/or "circumferentially" refer to the relative position/direction of objects along a circumference (c) which surrounds axis A but does not intersect the axis A at any location. It is further understood that common numbering between FIGURES can denote substantially identical components in the FIGURES.

Referring to FIG. 1, a perspective view of one embodiment of a gas turbine 2 is shown. In this embodiment, gas turbine 2 includes a compressor inlet 4, a compressor 6, a plurality of combustors 8, a compressor discharge (not shown), a turbine 12 including a plurality of turbine blades 14, a rotor 16 and a gas outflow 18. Compressor inlet 4 supplies air to compressor 6. Compressor 6 supplies compressed air to combustors 8 where it mixes with fuel. Combustion gases from combustors 8 propels turbine blades 12. Propelled turbine blades 12 rotate rotor 16. A casing 20 forms an outer enclosure that encloses compressor inlet 4, compressor 6, plurality of combustors 8, compressor discharge (not shown), turbine 12, turbine blades 14, rotor 16 and gas outflow 18. Gas turbine 2 is only illustrative; teachings of the invention may be applied to a variety of gas turbines.

Figure 2:
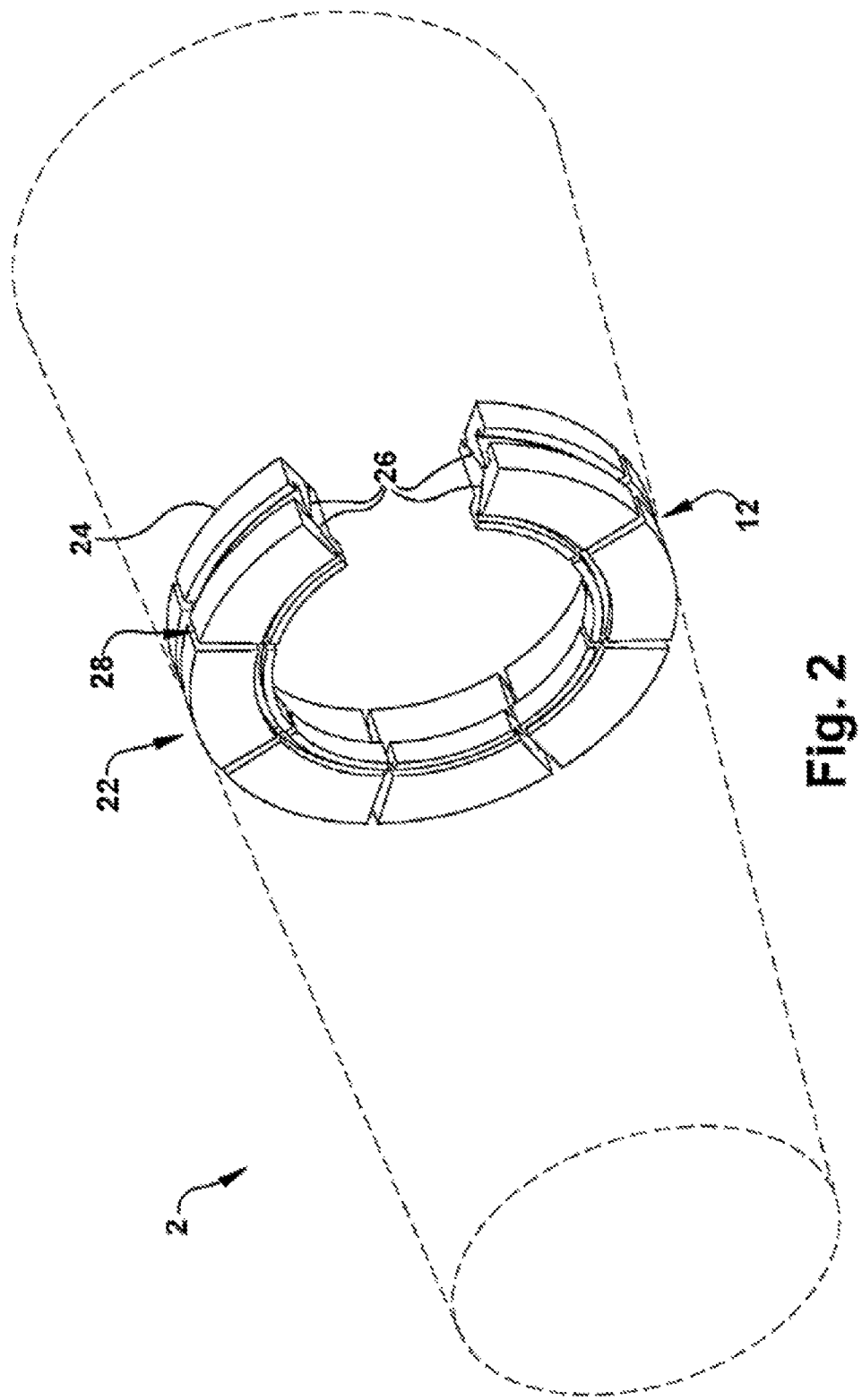
FIG. 2 shows a perspective view of known arc segments in an annular arrangement.

Referring to FIG. 2, a perspective view of one embodiment of an annular arrangement 22 of arc segments 24 of turbine 12 of gas turbine 2 is shown. This view shows seven arc segments 24 with one arc segment removed for illustrative purposes. The end of each arc segment 24 has slots 26. Between each arc segment 24 is a space 28. A person skilled in the art will readily recognize that annular arrangement 22 may have any number of arc segments 24; that arc segments 24 may be of varying shapes and sizes; and that arc segments 24 may serve different functions in gas turbine 2. For example, arc segments in a turbine may include, but not be limited to, outer shrouds, inner shrouds, nozzle blocks, and diaphragms as discussed below.

Figure 3:
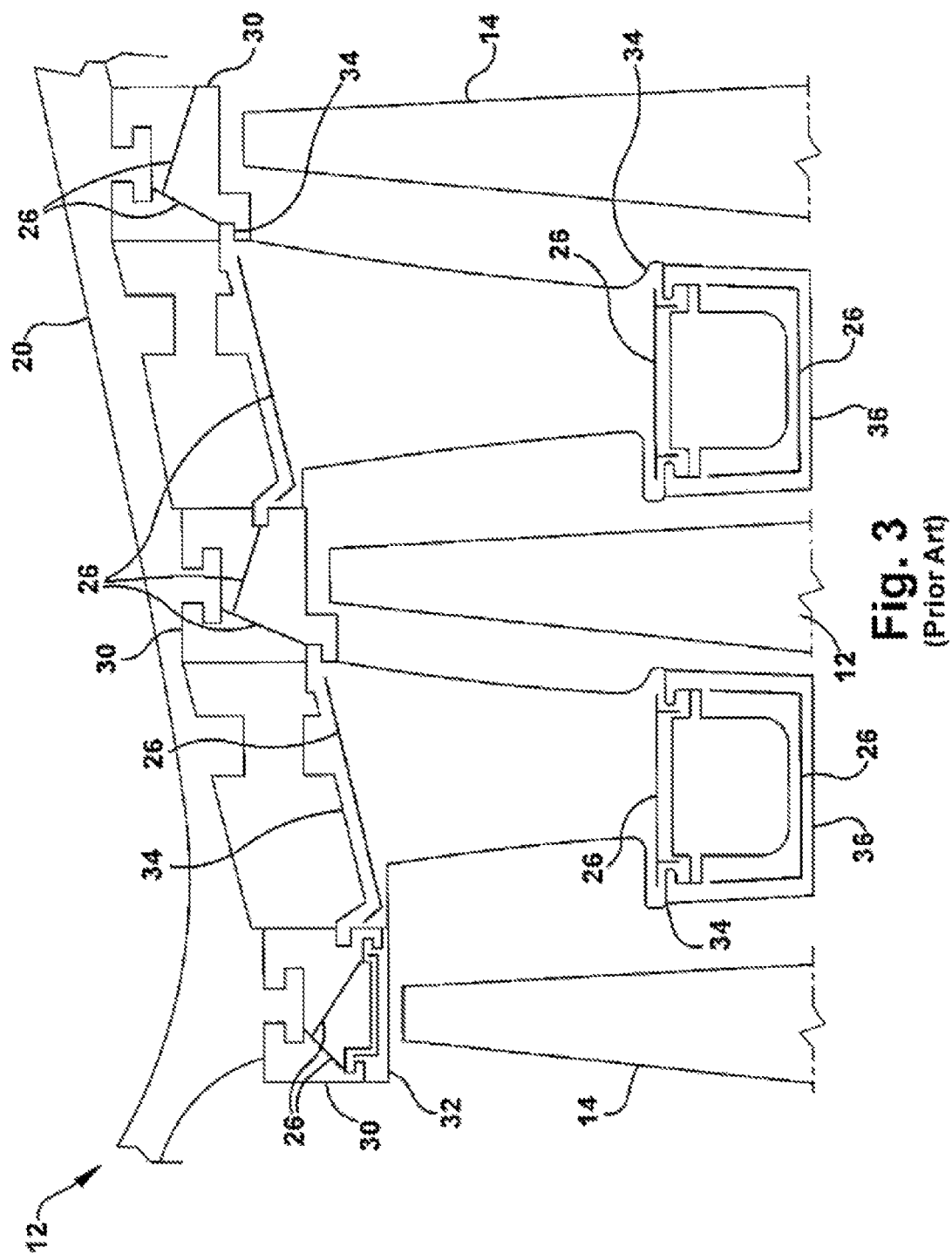
FIG. 3 shows a cross-sectional longitudinal view of a known turbine of a gas turbine.

Referring to FIG. 3, a cross-sectional view of one embodiment of turbine 12 of gas turbine 2 (FIG. 1) is shown. In this embodiment, casing 20 encloses a plurality of outer shrouds 30, an inner shroud 32, a plurality of nozzle blocks 34, a plurality of diaphragms 36, and turbine blades 14. Each of the outer shrouds 30, inner shroud 32, nozzle blocks 34 and diaphragms 36 are arc segments 24. Each of the outer shrouds 30, inner shrouds 32, nozzle blocks 34 and diaphragms 36 have slots 26 in a side thereof. In this embodiment, outer shrouds 30 connect to casing 20; inner shroud 32 connects to outer shrouds 30; nozzle blocks 34 connect to outer shrouds 30; and diaphragms 36 connect to nozzle blocks 34. A person skilled in the art will readily recognize that many different arrangements and geometries of arc segments are possible. Alternative embodiments, may include different arc segments, more arc segments, or less arc segments.

Figure 4:
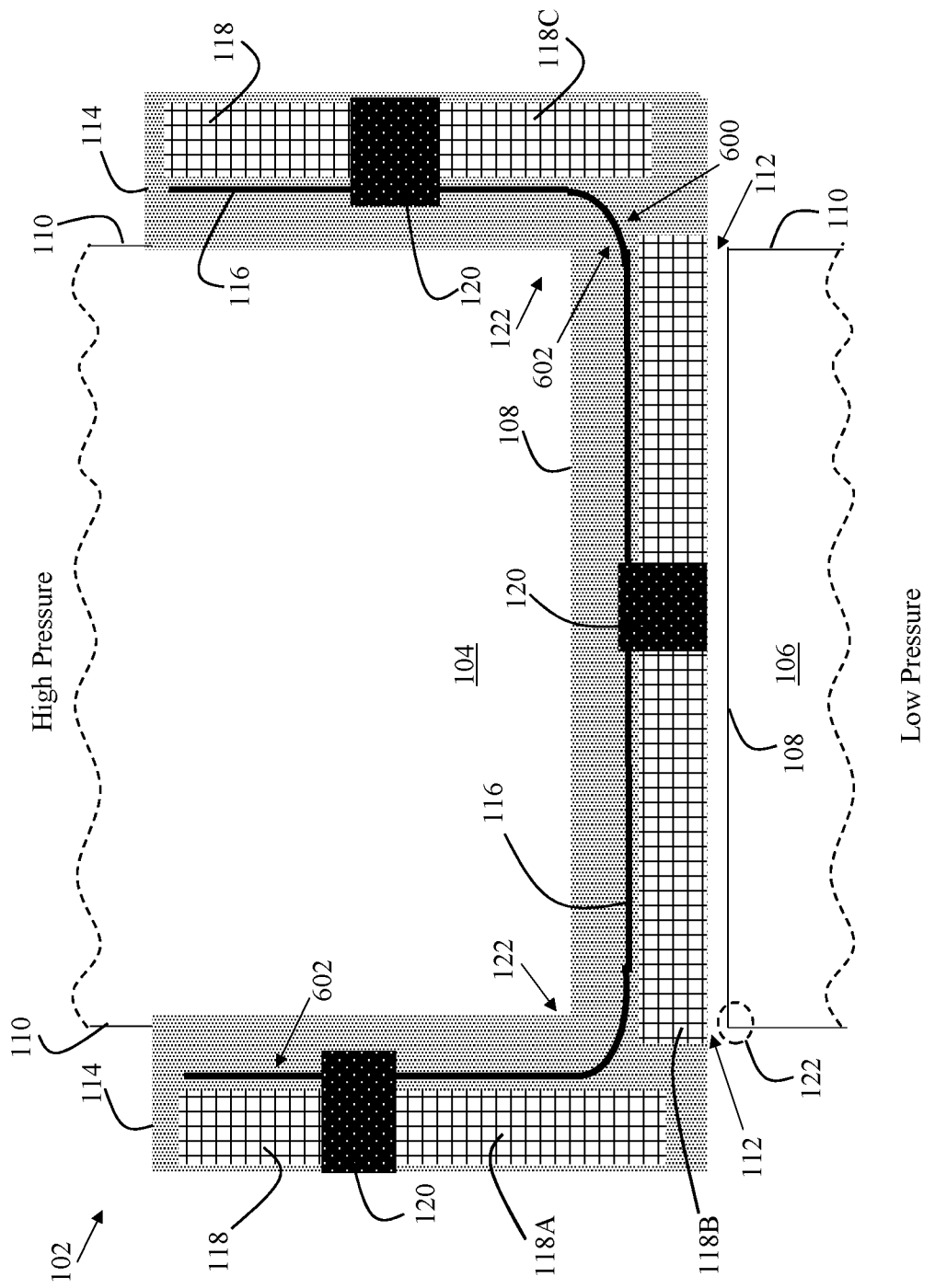
FIG. 4 shows a schematic cross-sectional side view of a section of a turbine according to various embodiments of the disclosure.

Turning to FIG. 4, a section of a gas turbine 102 is shown according to various embodiments, the gas turbine 102 including a first arc segment 104 adjacent a second arc segment 106, each arc segment 104, 106 including an end surface 108 and radially facing surfaces 110 extending from opposite ends of the end surface 108. Turbine 102 can also include a slot 112 located between end surfaces 108 of first arc segment 104 and second arc segment 106. In various embodiments, turbine 102 can also include a first seal 114 disposed in slot 112, where first seal 114 contacts first arc segment 104 at its end surface 108, and extends over radially facing surfaces 110 of first arc segment 104. The first seal 114 can include: a shim 116 contacting first arc segment 104, a laminate material 118 over shim 116 and covering shim 116, and a conforming material 120 coupling the laminate material 118 to the shim 116. It is understood that according to various embodiments, laminate material 118 can include a plurality of individual layers (e.g., shims) which can be bonded, welded or otherwise joined to form a material. In some cases, the individual layers of the laminate material 118 can include one or more metal layers, and in some cases, the individual layers are welded (e.g., spot welded) to one another, allowing for flexibility of the laminate material 118 (e.g., torsional movement).

In various embodiments, conforming material 120 has a melting temperature causing the conforming material 120 to substantially disintegrate during operation of the turbine 102, for example, a melting temperature of approximately 65 degrees Celsius (approximately 150 degrees Fahrenheit) to approximately 485 degrees Celsius (approximately 900 degrees Fahrenheit. In various embodiments, conforming material 120 includes at least one of: rubber, silicone, plastic, wax, related low-melting temperature materials, or composites thereof.

In some cases, as shown in FIG. 4, laminate material 118 includes a plurality of segments 118A, 118B, 118C, where each segment is separated from its neighboring segment (e.g., 118A and 118B). Each segment 118A, 118B, 118C of laminate material 118 can correspond with a distinct surface of first arc segment 104, e.g., segment 118A corresponds with a first radially facing surface 110, segment 118B corresponds with end surface 108 and segment 118C corresponds with a second radially facing surface 110.

As noted herein, the conforming material 120 can have a melting temperature causing it to substantially disintegrate during operation of the turbine 102. According to various embodiments, the shim 116 and laminate material 118 (including segments 118A, 118B, 118C) are adapted to move independently of one another when the conforming material 120 (between shim 116 and segments of laminate material 118) has substantially disintegrated. In various embodiments, shim 116 is a single, continuous piece of metal, and in some cases, substantially seals corner regions 122 spanning between end surface 108 and each of radially facing surfaces 110. In some particular embodiments, shim 116 has a thickness of approximately 0.0025 millimeters to approximately 1.3 millimeters.

Figure 5:
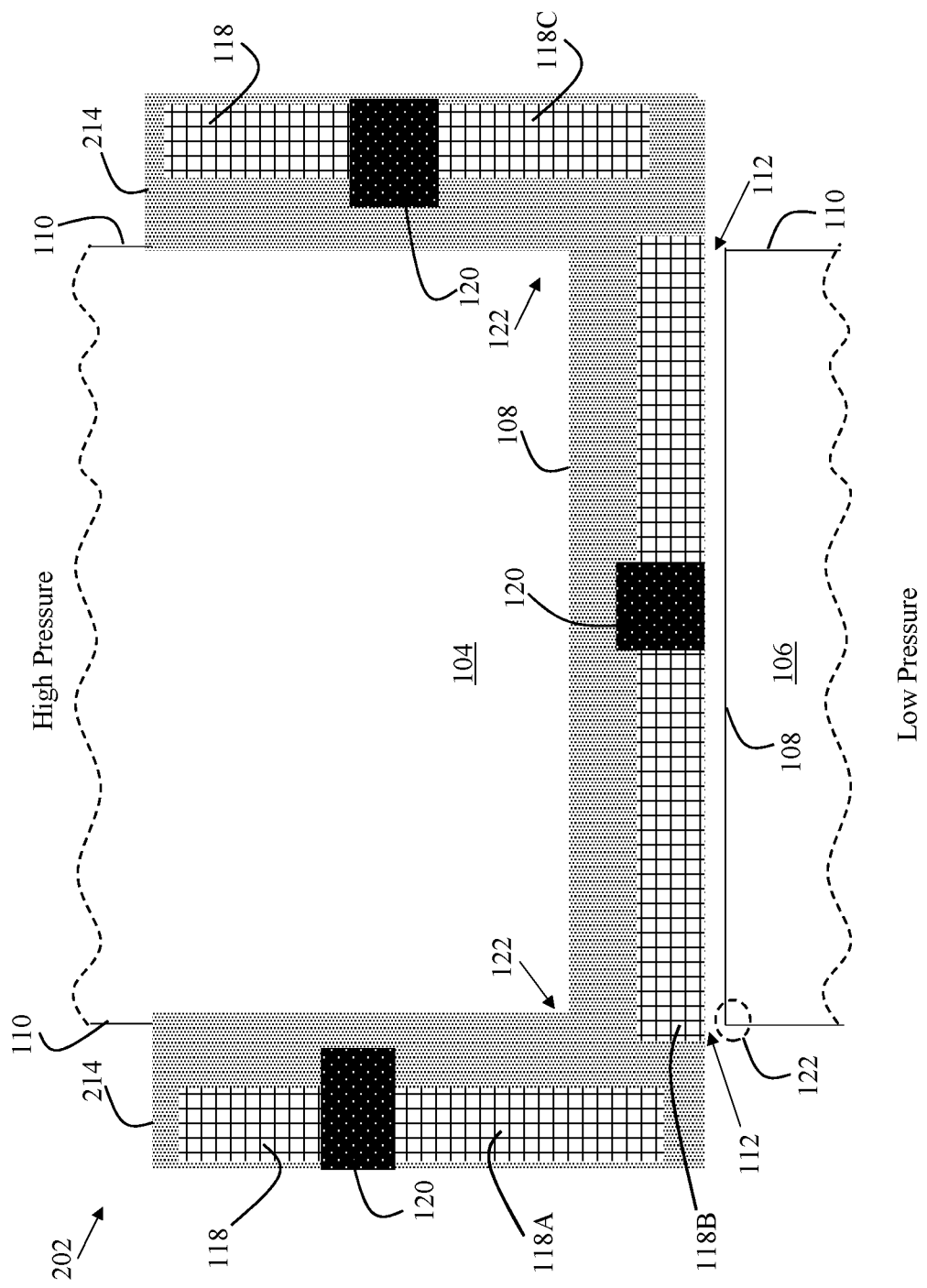
FIG. 5 shows a schematic cross-sectional side view of a section of a turbine according to various additional embodiments of the disclosure.

FIG. 5 shows an alternative view of a section of a gas turbine 202 according to various additional embodiments. It is understood that commonly labeled components between the FIGURES can represent substantially identical components (e.g., first arc segment 104 adjacent a second arc segment 106, each arc segment 104, 106 including an end surface 108 and radially facing surfaces 110 extending from opposite ends of the end surface 108, and slot 112 located between end surfaces 108 of first arc segment 104 and second arc segment 106). In various embodiments, turbine 202 can include a second seal 214 disposed in slot 112, where second seal 114 contacts first arc segment 104 at its end surface 108, and extends over radially facing surfaces 110 of first arc segment 104. The second seal 114 can include: a laminate material 118 contacting first arc segment 104, and a conforming material 120 sealing the end surface 108 and radially facing surfaces 110 of the first arc segment 104.

In various embodiments, conforming material 120 has a melting temperature causing the conforming material 120 to substantially disintegrate during operation of the turbine 102, for example, a melting temperature of approximately 65 degrees Celsius (approximately 150 degrees Fahrenheit) to approximately 485 degrees Celsius (approximately 900 degrees Fahrenheit. In various embodiments, conforming material 120 includes at least one of: rubber, silicone, plastic, wax, related low-melting temperature materials, or composites thereof.

In some cases, as shown in FIG. 4, laminate material 118 includes a plurality of segments 118A, 118B, 118C, where each segment is separated from its neighboring segment (e.g., 118A and 118B). Each segment 118A, 118B, 118C of laminate material 118 can correspond with a distinct surface of first arc segment 104, e.g., segment 118A corresponds with a first radially facing surface 110, segment 118B corresponds with end surface 108 and segment 118C corresponds with a second radially facing surface 110.

As noted herein, the conforming material 120 can have a melting temperature causing it to substantially disintegrate during operation of the turbine 102. According to various embodiments, the laminate material 118 (including segments 118A, 118B, 118C) are adapted to move when the conforming material 120 has substantially disintegrated, for example, moving closer to radially facing surfaces 110 as the conforming material 120 disintegrates, thereby contacting each other (e.g., segment 118A and segment 118C each contact 118B as conforming material disintegrates and close gaps at corner regions 122.

Figure 6:
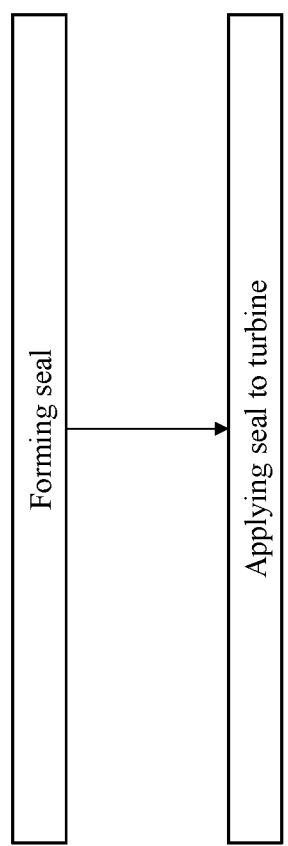
FIG. 6 shows a flow diagram illustrating a method according to various embodiments of the disclosure.

FIG. 6 is a flow diagram illustrating a method of forming a seal (e.g., first seal 114 and/or second seal 214) according to various embodiments of the disclosure. Reference is also made simultaneously to the remaining FIGURES. The method can include the following processes:

Process P1: forming a seal (e.g., first seal 114 or second seal 214), the forming including coupling laminate material 118 (e.g., segments 118A, 118B, 118C) to a first side 600 of shim 116 using conforming material 120 (FIG. 4). In various embodiments, coupling laminate material 118 to first side 600 of shim 116 includes sliding the conforming material 120 over the laminate material 118 and the shim 116.

Process P2: applying the seal (e.g., first seal 114 or second seal 214) to a turbine (e.g., gas turbine 102, FIG. 4), where applying includes inserting the seal 114, 214 in the slot 112 such that a second side 602 of the shim 116 of the seal contacts 114, 214 the first arc segment 104 at the end surface 108 and extends over the radially facing surfaces 110 of the first arc segment 104, where the second side 602 of the shim 116 opposes the first side 600 of the shim 116.

It is understood that in the flow diagrams shown and described herein, other processes may be performed while not being shown, and the order of processes can be rearranged according to various embodiments. Additionally, intermediate processes may be performed between one or more described processes. The flow of processes shown and described herein is not to be construed as limiting of the various embodiments.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gas turbine comprising:
    a first arc segment adjacent to a second arc segment, each arc segment including an end surface and radially facing surfaces extending from opposite ends of the end surface;
    a slot located between the end surfaces of the first arc segment and the second arc segment; and
    a first seal disposed in the slot, the first seal contacting the first arc segment at the end surface and extending over the radially facing surfaces of the first arc segment, the first seal including:
        a shim contacting the first arc segment;
        a laminate material over the shim and covering the shim; and
        a conforming material coupling the laminate material to the shim, wherein the conforming material has a melting temperature causing the conforming material to substantially disintegrate during operation of the gas turbine.

2. The gas turbine of claim 1, wherein the conforming material includes at least one of: rubber, silicone, plastic, wax, a low-melting temperature material, or composites thereof.

3. The gas turbine of claim 1, wherein the laminate material includes a plurality of segments each corresponding with the end surface and the radially facing surfaces, respectively, of the first arc segment.

4. The gas turbine of claim 1, wherein the shim and the laminate material are adapted to move independently of one another when the conforming material has substantially disintegrated.

5. The gas turbine of claim 1, wherein the shim substantially seals corner regions spanning between the end surface and each of the radially facing surfaces.

6. A gas turbine comprising:
a first arc segment adjacent to a second arc segment, each arc segment including an end surface and radially facing surfaces extending from opposite ends of the end surface, wherein the end surfaces face one another and are substantially coincident;
a slot located between the end surfaces of the first arc segment and the second arc segment; and
a first seal disposed in the slot, the first seal contacting the first arc segment at the end surface and extending over the radially facing surfaces of the first arc segment, the first seal including:
a shim contacting the first arc segment;
a laminate material over the shim and covering the shim, the laminate material including a plurality of segments each contacting the shim; and
a conforming material coupling the laminate material to the shim, wherein the conforming material has a melting temperature causing the conforming material to substantially disintegrate during operation of the gas turbine.

7. The gas turbine of claim 6, wherein the conforming material includes at least one of: rubber, silicone, plastic, wax, a low-melting temperature material, or composites thereof.

8. The gas turbine of claim 6, wherein the plurality of segments of the laminate material include three segments each corresponding with the end surface and the radially facing surfaces, respectively, of the first arc segment.

9. The gas turbine of claim 6, wherein the shim and the laminate material are adapted to move independently of one another when the conforming material has substantially disintegrated.

10. The gas turbine of claim 6, wherein the shim substantially seals corner regions spanning between the end surface and each of the radially facing surfaces.

11. The gas turbine of claim 6, wherein the shim has a thickness of approximately 0.0025 millimeters to approximately 1.3 millimeters.

12. A method of assembling a seal in a turbine, the method comprising:
forming a seal, the forming including: coupling a laminate material to a first side of a shim using a conforming material, wherein the conforming material has a melting temperature causing the conforming material to substantially disintegrate during operation of the turbine; and
applying the seal to the turbine, the turbine having:
a first arc segment adjacent to a second arc segment, each arc segment including an end surface and radially facing surfaces extending from opposite ends of the end surface; and
a slot located between the end surfaces of the first arc segment and the second arc segment,
the applying including inserting the seal in the slot such that a second side of the shim of the seal contacts the first arc segment at the end surface and extends over the radially facing surfaces of the first arc segment, the second side of the shim opposing the first side of the shim.

13. The method of claim 12, wherein the conforming material includes at least one of: rubber, silicone, plastic, wax, a low-melting temperature material, or composites thereof.

14. The method of claim 12, wherein the coupling of the laminate material to the first side of the shim includes sliding the conforming material over the laminate material and the shim.

15. The method of claim 12, wherein laminate material has a plurality of segments including three segments each corresponding with the end surface and the radially facing surfaces, respectively, of the first arc segment.

16. The method of claim 12, wherein the shim and the laminate material are adapted to move independently of one another when the conforming material has substantially disintegrated.

17. The method of claim 12, wherein the shim substantially seals corner regions spanning between the end surface and each of the radially facing surfaces.

18. A gas turbine comprising:
a first arc segment adjacent to a second arc segment, each arc segment including an end surface and radially facing surfaces extending from opposite ends of the end surface;
a slot located between the end surfaces of the first arc segment and the second arc segment; and
a first seal disposed in the slot, the first seal contacting the first arc segment at the end surface and extending over the radially facing surfaces of the first arc segment, the first seal including:
a laminate material contacting the first arc segment; and
a conforming material contacting the laminate material and sealing the end surface and radially facing surfaces of the first arc segment, wherein the conforming material has a melting temperature causing the conforming material to substantially disintegrate during operation of the gas turbine.

19. The gas turbine of claim 18, wherein the conforming material includes at least one of: rubber, silicone, plastic, wax, a low-melting temperature material, or composites thereof.

20. The gas turbine of claim 18, wherein the laminate material includes a plurality of segments each corresponding with the end surface and the radially facing surfaces, respectively, of the first arc segment.

21. The gas turbine of claim 18, wherein the laminate material is adapted to move when the conforming material has substantially disintegrated.

* * * * *